United States Patent Office 3,637,770
Patented Jan. 25, 1972

3,637,770
PROCESS FOR THE PRODUCTION OF 16α,17α-DIHYDROXY-19-NOR-PROGESTERONE
Julien Warnant, Neuilly-sur-Seine, Jean Jolly, Clichy-sous-Bois, and Robert Joly, Montmorency, France, assignors to Roussel-UCLAF, Paris, France
No Drawing. Original application May 23, 1967, Ser. No. 640,507. Divided and this application Dec. 31, 1969, Ser. No. 1,920
Claims priority, application France, Sept. 1, 1966, 74,982
Int. Cl. C07c *169/32*
U.S. Cl. 260—397.4                     8 Claims

ABSTRACT OF THE DISCLOSURE

A process for the production of 16α,17α-dihydroxy-19-nor-progesterone from a 3,5-diketal of 4,5-seco-estrane-3,5,17-trione by 17-cyanation, 16-dehydration, methylation, hydrolysis of the ketals, cyclization of the A ring and hydroxylation of the Δ¹⁶ bond. The intermediates are also part of the disclosure.

REFERENCE TO PRIOR APPLICATIONS

This application is a division of United States patent application Ser. No. 640,507, filed May 23, 1967.

THE PRIOR ART

It is a well known fact that the preparation of 19-nor steroids substituted in the 17 position presents difficult problems due to the presence of the functions on the steroid molecule apt to be attacked at the very moment of the introduction of the desired substituent in the 17 position. This is the case, in particular, with steroids having a ketone function in the 3 position and/or double bond in the 4,5 position.

Moreover, it is known that in the former processes for the preparation of steroid derivatives by means of total synthesis, the authors have, as a rule, preferred to complete the construction of the steroid skeleton first, and only then to proceed with the substitution in the 17 position (see, for example, Velluz et al., "Recent Advances in the Total Synthesis of Steroids," Angew. Chem. Intern, Edit., vol. 4 [1965] No. 3).

OBJECTS OF THE INVENTION

An object of the present invention is the obtention of a steroid intermediate which can undergo substitution in the 17 position and thereafter total synthesis steps to form a steroid substituted in the 17 position.

A still further object of the present invention is the obtention of 17 substituted steroids by a process of total synthesis.

These and other objects of the present invention will become more apparent as the description thereof proceeds.

DESCRIPTION OF THE INVENTION

It has now been discovered that a novel class of intermediate products for the synthesis of steroid derivatives, namely, the 3,5-diketals of 13β-alkyl-4,5-seco-gonane-3,5,17-triones of the general formula given in the above, permit, in contrast to the 3-monoketals already known, to bypass the difficulties previously met with in the preparation of 19-nor steroids substituted in the 17 position, due to the possibility of introducing at this stage the desired substituents in the 17 position.

The 3,5-diketals of the 13β-alkyl-4,5-secogonane-3,5,17-triones thus formed show in neutral or alkaline medium an excellent stability with regard to the functions in the 3 and 5 positions, which facilitates the possible conversions in the 17 position. Moreover, they are, after splitting off the ketal functions in the 3 and 5 positions, easily cyclized by the usual agents to give the tetracyclic steroid skeleton.

The present invention relates to a new class of intermediate products for the synthesis of steroid derivatives as well as to a process for the preparation of these products.

More particularly, the invention relates to the 3,5-diketals of the 13β-alkyl-4,5-seco-gonane-3,5,17-triones of the general Formula I

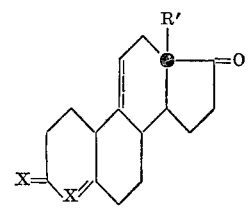

I wherein, here and in the following, R' is an alkyl radical containing 1 to 4 carbon atoms, X represents the group

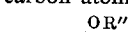

R'' being a lower alkyl, or X represents the group

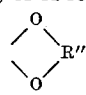

R''' being a lower alkylene radical, substituted or unsubstituted, and the dashed line represents a possible 9(11) double bond.

The process for the preparation of the compounds of the general Formula I is characterized in that a 3-Z-13β-alkyl-17β-OR-4,5-seco-gonane-5-one of the general Formula II

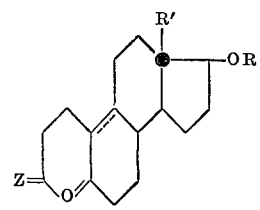

II wherein Z represents a ketone oxygen or X, R' and X having the above assigned meanings, R is hydrogen or the acyl radical of an organic carboxylic acid having 1 to 18 carbon atoms, and the dashed line represents a possible 9(10) double bond, is subjected to the action of a ketalization agent, the diketal obtained, of the general Formula III

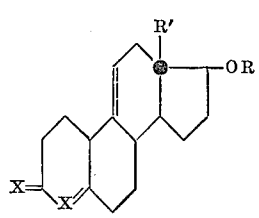

III wherein X, R, R' and the dashed line have the above-assigned meanings, when R represents the radical of an organic carboxylic acid having from 1 to 18 carbon atoms, is saponified, and the diketal of the general Formula IV

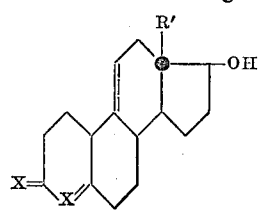

IV wherein X, R and the dashed line have the above-assigned meanings, is reacted with an oxidizing agent, and the desired 3,5-diketal of 13β-alkyl-4,5-seco-gonane-3,5,17-trione is isolated.

The process can be advantageously executed as follows:

(A) The ketalization agent is chosen from the group consisting of the lower cyclic ketals, the lower non-cyclic ketals and the lower alkanols. The work is conducted in the presence of an acid catalyst.

(B) The cyclic ketals are chosen from the group consisting of 2-methyl-2-ethyl-dioxolane, 2-methyl-2-phenyl-dioxolane, 2-methyl-4-(6-methylbenzyl)-dioxolane, 2,2-dimethyl-4-(6-methylbenzyl) - dioxolane, 2-chloromethyl-dioxolane, 2-(β-chloro) - ethyl - dioxolane and 2-(β-bromo)-ethyl-dioxolane.

(C) The non-cyclic ketals are selected from the group consisting of the dimethyl ketal of acetone, the diethyl ketal of acetone, the dimethyl ketal of 2-butanone, the dimethyl ketal of dimethylformamide and the diethyl ketal of dimethylformamide.

(D) The aliphatic alcohols employed as ketalizing agents are chosen from the group consisting of glycols such as lower alkanediols, for example, ethyleneglycol, 1,3-propanediol, 2,2-dimethyl - 1,3 - propanediol, and of lower alkanols such as methanol or ethanol.

(E) The saponification of the 3,5-diketal of 13β-alkyl-17β-acyloxy-4,5-seco - gonane - 3,5-dione of the general Formula III is effected by an alkaline agent such as an alkali metal hydroxide, for example, sodium or potassium hydroxide. The work is carried out in a lower alkanol such as methanol or ethanol.

(F) The oxidation of the hydroxyl in the 17 position is realized according to the Oppenauer method by means of a lower aliphatic ketone such as lower alkanones, for example, acetone, methylethyl ketone, methylisobutyl ketone or lower cycloalkanones, for example, cyclohexanone, in the presence of an aluminum tertiary lower alkanolate such as aluminum isopropylate.

(G) The oxidation of the hydroxyl in the 17 position is effected by using, as oxidizing agent, chromic acid anhydride in pyridine.

As it has already been mentioned, the advantages of the novel compounds of the general Formula I lie in particular in the fact that they allow an easy preparation of 19-nor steroids substituted in the 17 position, as it will be explained in the following.

The introduction of a substituent in the 17α position is realized, for example, by reaction of a compound of Formula I with an organometallic compound of the type $R^{iv}Li$ or $R^{iv}MgX$ (X being a halogen and, in particular, bromine or iodine and $R^{iv}$ represents a hydrocarbon radical, preferably lower alkyl, lower alkenyl or lower alkynyl).

The 3,5-diketals of the 13β-alkyl-17α-$R^{iv}$-17β-hydroxy-4,5-seco-gonane-3,5-diones, possibly having a double bond in the 9(11) position, obtained by the above reactions, can be esterified in the 17 position with an organic carboxylic acid having from 1 to 18 carbon atoms by employing the usual acylation agents such as the corresponding acid, its anhydride or its chloride.

Such acids are the aliphatic or cycloaliphatic carboxylic acids, saturated or unsaturated, or the aromatic or heterocyclic carboxylic acids, for example, the alkanoic acids such as formic, acetic, propionic, butyric, isobutyric, valeric, isovaleric, trimethylacetic, caproic, β-trimethylpropionic, enanthic, caprylic, pelargonic, capric, undecylic, lauric, myristic, palmitic, stearic, etc., the alkenoic acids such as undecylenic, oleic, etc., the cycloalkyl carboxylic acids such as cyclopentyl-, cyclopropyl-, cyclobutyl- and cyclohexyl-carboxylic acids, the cycloalkylalkanoic acids such as cyclopropylmethyl carboxylic acid, cyclobutylmethyl carboxylic acid, cyclopentylethyl carboxylic acid, cyclohexylethyl carboxylic acid, the cyclopentylacetic, cyclohexylacetic, or propionic acids, the phenylalkanoic acids such as phenylacetic or propionic acids, benzoic acid, the phenoxylalkanoic acids such as phenoxyacetic acids, p-chlorophenoxyacetic acid, 2,4-dichlorophenoxyacetic acid, 4-tert.-butyl-phenoxyacetic acid, 3-phenoxypropionic acid, 4-phenoxybutyric acid, the furane 2-carboxylic acids such as 5-tert.-butylfurane-2-carboxylic acid, 5-bromo-furane-2-carboxylic acid, the nicotinic acids, the β-ketoalkanoic acids, for example, the acetylacetic, propionylacetic, butyrylacetic acids, etc.

The 3,5-diketals of the 13β-R'-17α-$R^{iv}$-17β-hydroxy-4,5-seco-gonane-3,5-diones with or without a 9(11) double bond, whether esterified or unesterified in the 17β position, can be subsequently converted into tetracyclic steroids.

For that purpose, such a 3,5-diketal of a 13β-R'-17α-$R^{iv}$-17β-hydroxy- or 17β - acyloxy-4,5-seco-gonane-3,5-dione formed as indicated above is subjected to a ketal hydrolysis in the presence of an acid, such as citric, acetic, hydrochloric or sulfuric acid, and in the presence of one or several solvents such as an alcohol, for example, the methanol or ethanol, and a hydrocarbon such as benzene or toluene. In this manner the ketones in the 3 and 5 positions are regenerated and the corresponding 3,5-dioxo derivative is recovered possibly having a double bond in the 9(10) position. Next, this 3,5-dioxo derivative is subjected to the action of a basic cyclization agent such as an alkali metal alcoholate, or to the action of an acid cyclization agent such as hydrochloric acid or the hydrochloric acid-acetic acid mixture.

Thus, a tetracyclic steroid of the general formula

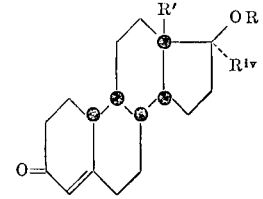

wherein R, R' and $R^{iv}$ have the previous meanings, is obtained, possibly with a double bond in the 9(10) position.

In the case where the cyclization agent is a secondary base such as, for example, pyrrolidine, the corresponding enamines are obtained in the 3-position, which by means of acid hydrolysis supply the above-indicated 3-oxo-Δ⁴ or 3-oxo-Δ⁴,⁹ derivatives.

As it has been shown in the preceding, tetracyclic steroids of gonanic structure can be prepared by starting with the compounds of Formula I. It is also possible to obtain by starting with the said compounds of Formula I, tetracyclic steroids of pregnanic structure having also a considerable physiological activity. Thus, for example, 16α,17α-dihydroxy-19-nor-progesterone and its condensation derivatives with carbonyl compounds can be prepared by means of a process starting from the 3,5-diketals of the general Formula I. The advantages of the new process will become evident by the following.

U.S. Pat. No. 3,243,433 describes a process for the preparation of 16α,17α-dihydroxy-19-nor-progesterone starting from 3-methoxy-16α,17α-isopropylidenedioxy-19-nor-Δ¹,³,⁵(¹⁰)-pregnatriene-20-ol. This process comprises four distinct operation steps.

The 3 - methoxy-16α,17α-isopropylidenedioxy-19-nor-Δ¹,³,⁵(¹⁰)-pregnatriene-20-ol is prepared according to the process described in U.S. Pat. No. 3,077,471, starting from 16α,17α-isopropylidenedioxy-progesterone, also in a process of four steps. One of these steps consists in demethylating in the 10 position a 1,4-dienic derivative of pregnane, which is thus converted into a derivative with an aromatic A ring. This demethylation is effected by pyrolysis at a temperature of 600° C.

Finally, 16α,17α-isopropylidenodioxy-progesterone is obtained, for example, by means of oxidation of 16-dehydro-progesterone (see U.S. Pat. No. 3,165,541 and French Pat. No. 1,158,850) which itself is prepared by starting with natural products such as the sapogenins (see U.S. Pat. No. 2,420,489) or progesterone (Pelman et al., J. Am. Chem. Soc. 74, 2126 [1952]).

The obtention of 16α,17α-dihydroxy-19-nor-progesterone, according to the processes mentioned above, is consequently lengthy and its overall yield is poor. Eight stages are actually necessary to obtain 16α,17α-dihydroxy-19-nor-progesterone, starting with 16α,17α-isopropylidenedioxy-Δ⁴-pregnene-3,20-dione, the preparation of which, starting from the sapogenins or progesterone, required supplementary steps.

Therefore, the process for the preparation of 16α,17α-dihydroxy-19-nor-progesterone and its condensation derivatives with carbonyl compounds, having been elaborated due to the utilization of a 3,5-diketal of the general Formula I as a starting compound, is advantageous from more than one viewpoint.

The said process is realized as follows:

In a basic medium, an alkali metal cyanide is reacted in the presence of an organic acid, preferably an alkanoic acid, on 3,5-bis-(ethylenedioxy)-4,5-seco-estrane-17-one, thus obtaining a mixture of isomeric cyanohydrins, rich in 3,5-bis-(ethylenedioxy)-17β-cyano-4,5-seco - estrane-17α-ol, which is then dehydrated by the action of an acid dehydrating agent in a polar solvent to obtain 3,5-bis-(ethylenedioxy)-17-cyano-4,5-seco-Δ¹⁶-estrene, on which methyl lithium or a methyl magnesium halide is reacted to form intermediately 3,5-bis-(ethylenedioxy)-20-imino-4,5-seco-19-nor-Δ¹⁶-pregnene. The hydrolysis of this product, effected in the presence of an acidic agent such as a lower alkanoic acid, leads to 4,5-seco-19-nor-Δ¹⁶-pregnene-3,5,20-trione. This product is then cyclized by the action of a secondary amine to obtain the enamine in the 3 position of 19-nor-Δ⁴,¹⁶-pregnadiene-3,20-dione. This latter compound is subjected to the action of an acid agent, such as a mineral acid to form the corresponding imonium salt, which is then hydrolyzed in situ by the action of a basic agent, such as an aqueous alkali metal hydroxide, thus obtaining 19-nor-Δ⁴,¹⁶-pregnadiene-3,20-dione. This compound, by the action of a hydroxylating agent, which acts on the 16(17) double bond, supplies 19-nor-Δ⁴-pregnene-16α,17α-diol-3,20-dione, which is condensed either with an aldehyde or ketone as desired.

In comparison with the process described in the preceding, corresponding, in particular, to U.S. Pats. Nos. 3,243,433 and 3,077,471, the new process possesses the advantage of making possible the access to 16α,17α-dihydroxy-19-nor-progesterone and its condensation derivatives with carbonyl compounds by means of total synthesis. It follows, therefrom that the process of demethylation in the 10 position of the pregnane derivatives, always a difficult and onerous task, is thus avoided and that the process is relatively brief. Only six operational steps are actually needed to arrive at 16α,17α-dihydroxy-19-nor-progesterone starting with 3,5-bis-(ethylenedioxy)-4,5-seco-estrane-17-one.

In the above process for the production of 16α,17α-dihydroxy-19-nor-progesterone and its condensation derivatives with carbonyl compounds, it is preferable to utilize the following operatory steps:

(A) In the preparation of the cyanohydrin, the alkali metal cyanide is potassium cyanide or sodium cyanide. The lower alkanoic acid utilized is acetic or propionic acid. It is also preferable to operate in the presence of a polar organic solvent, preferably a lower alkanol such as ethanol or methanol. In order to obtain the 17β-cyano-17α-hydroxylated derivative in preponderance, it is advisable to utilize a basic media and a deficiency of the organic acid with respect to the amount of alkali metal cyanide utilized.

(B) The desired 17α-hydroxylated epimer is separated by fractional crystallization from an aliphatic ether such as ethyl ether. The 17β-hydroxylated epimer is recovered from the mother liquor and converted to the starting compound by action of a strong base.

(C) The acid dehydrating agent utilized for the dehydrating of 3,5-bis-(ethylenedioxy)-17β-cyano - 4,5 - seco-estrane-17α-oil is, for example, thionyl chloride, phosphorus oxychloride, methanesulfonyl chloride, etc. The polar solvent utilized is preferably a cyclic tertiary amine such as pyridine or methylethyl pyridine. An excess of the acid dehydrating agent is utilized and the reaction is advantageously effected at room temperature.

(D) The methylation with methyl lithium or methyl magnesium halide is conducted in the presence of an aliphatic or cyclic ether such as ethyl ether or tetrahydrofurane. The cyano derivative is solubilized in a solvent such as benzene. The imino compound obtained is not isolated and is hydrolyzed at the same time as the ketal functions by the addition to the reaction medium of a lower alkanoic acid such as acetic or propionic acid.

(E) The secondary amine utilized as a cyclization agent is preferably pyrrolidine or a substituted pyrrolidine and the reaction takes place preferably in the presence of a polar organic solvent, for example, a lower alkanol such as ethanol or methanol.

(F) The mineral acid employed for the formation of the imonium salt is preferably sulfuric or hydrochloric acid in an aqueous medium. The imonium salt is not isolated and is hydrolyzed by the action of an aqueous alkali metal hydroxide such as sodium hydroxide or potassium hydroxide.

(G) The hyroxylating agent which acts on the 16(17) double bond is advantageously potassium permanganate or osmium tetraoxide.

(H) The 16α,17α-dihydroxy-19-nor-progesterone can be easily condensed with a carbonyl compound such as an aldehyde or a ketone while operating in the presence of a strong mineral acid such as perchloric acid. If acetone is utilized under these conditions, 16α,17α-isopropylidenedioxy-19-nor-progesterone is obtained, whereas when acetophenone is employed, 16α,17α-(phenylethylenedioxy)-19-nor-progesterone is obtained.

The starting compounds of the process of the invention are described and are accessible by application of the processes of French Pats. Nos. 1,243,000, 1,364,556, 1,476,509 and 1,432,569.

The following examples will serve for better comprehension of the invention. The process described in the following can also be applied with the same readiness to the 13β-ethyl, 13β-propyl or 13β-butyl derivatives as to the 13β-methyl derivatives.

EXAMPLE I

Preparation of 3-ethylenedioxy-4,5-seco-estrane-17β-ol-5-one 900 cc. of toluene, 18 cc. of pyridine, 180 gm. of 3-ethylenedioxy-4,5-seco-Δ⁹-estrene-17β-ol-5-one and 72 gm. of palladized talc containing 2% of palladium, were introduced into a hydrogenation vessel. The vessel was purged and the mixture was agitated under an atmosphere of hydrogen at room temperature. Over a period of 6 hours about 12 liters of hydrogen were absorbed.

Thereafter, the reaction solution was filtered and 180 cc. of water were added thereto. Next, the washing was effected, followed by decanting, first with an aqueous solution of normal sulfuric acid to eliminate the pyridine, then with an aqueous solution of sodium bicarbonate and finally with water until the wash waters were neutral. The toluene phase was dried over magnesium sulfate, concentrated to dryness under reduced pressure, thus obtaining 180 gm. of raw 3-ethylenedioxy-4,5-seco-estrane-17β-ol-5-one. This product was used as such for the next step.

A sample of this product was purified for analysis by recrystallization from isopropyl ether containing 1 part per thousand of pyridine, then from ethyl ether containing 1 part per thousand of pyridine. It had a melting point of 80° to 85° C. and a specific rotation $[\alpha]_D^{20} = +3° \pm 1°$ (c.=1% in methanol containing 1% of pyridine), and it possessed the following characteristics:

*Analysis.*—$C_{20}H_{32}O_4$; molecular weight=336.46. Calculated (percent): C, 71.39; H, 9.59. Found (percent): C, 71.2; H, 9.5.

Infrared spectra (in chloroform)

Absorption at:
  1,704 cm.$^{-1}$: carbonyl
  3,600 cm.$^{-1}$: hydroxyl
  and C—O—C band, characteristic of the ketal function.

This product is not described in the literature.

The 3 - ethylenedioxy-4,5-seco-$\Delta^9$-estrene-17β-ol-5-one, utilized as the starting product in the preceding preparation, was obtained in the course of the process described in French Pat. No. 1,364,556.

In an analogous manner, the 3-ethylenedioxy-13β-ethyl-4,5-seco-gonane-17β-ol-5-one was prepared by starting with 3-ethylenedioxy-13β-ethyl-4,5-seco-$\Delta^9$-gonene-17β-ol-5-one, having a melting point of 95° to 100° C., this product being obtained in the course of the process described in the French Pat. No. 1,476,509. The 3-ethylenedioxy-13β-ethyl-4,5-seco-gonane-17β-ol-5-one is not described in the literature.

EXAMPLE II

Preparation of 3,5-bis-(ethylenedioxy)-4,5-seco-estrane-17-one

Step A: Preparation of 3,5-bis-(ethylenedioxy)-4,5-seco-estrane-17β-ol.—Under an inert atmosphere, first 70 gm. of 3-ethylenedioxy-4,5-seco-estrane-17β-ol-5-one, then 0.35 gm. of paratoluene sulfonic acid were introduced into 350 cc. of methylethyldioxolane. The mixture was agitated for about 15 hours. Thereafter, the reaction mixture was made alkaline with 2.1 cc. of pyridine, agitated for 10 minutes, then 126 cc. of water and 14 cc. of a saturated aqueous solution of sodium bicarbonate were added. The organic phase was separated by decanting and washed with water. The aqueous wash waters were extracted with benzene, which was washed with water, then combined with the organic phase previously isolated and washed. These combined organic phases were dried over magnesium sulfate and concentrated to dryness under reduced pressure. The residue was taken up in isopropyl ether and concentrated to dryness under reduced pressure. 84 gm. of a raw product were recovered, which was crystallized from isopropyl ether, obtaining 69.7 gm. of 3,5-bis-(ethylenedioxy)-4,5-seco-estrane-17β-ol.

The product had a specific rotation $[\alpha]_D^{20}=+18°\pm1°$ (c.=1% in methanol containing 1% of pyridine).

By concentration of the mother liquors resulting from the crystallization, a second yield of product was obtained.

A sample of the product was purified for analysis from isopropyl ether containing 1 part per thousand of pyridine. It had a melting point of 90° to 100° C. and a specific rotation $[\alpha]_D^{20}=+19°\pm1°$ (c.=1% in methanol containing 1% of pyridine), and possessed the following characteristics:

*Analysis.*—$C_{22}H_{36}O_5$; molecular weight=380.50. Calculated (percent): C, 69.44; H, 9.53. Found (percent): C, 69.1; H, 9.7.

Infrared spectra (in chloroform)

Absorption at 3,600 cm.$^{-1}$: hydroxyl and C—O—C band characteristic of the ketal function.

This product is not described in the literature.

Step B: Preparation of 3,5-bis-(ethylenedioxy)-4,5-seco-estrane-17-one.—Under an inert atmosphere, 40 gm. of purified 3,5-bis-(ethylenedioxy)-4,5-seco-estrane-17β-ol were dissolved in a mixture of 400 cc. of toluene and 80 cc. of methylethylketone in a 2-liter vessel equipped with an agitation means and a descending condenser. The solution was brought to boiling point under agitation. Then after distillation had been established, a solution of 14.4 gm. of aluminum isopropylate in 540 cc. of toluene and 720 cc. of methylethylketone was introduced. This addition was effected as follows: The two reactants were introduced simultaneously at regular intervals for about 15 minutes and within a total time of 4 to 5 hours in such a manner that the evaporated solvent volume was proportionately compensated by the addition of the two reactants. Thus, within a space of about 4 to 5 hours, 1,260 cc. of distillate were recovered. The distillation was continued until 80 cc. of distillate were recovered. The reaction mixture was cooled. Next, 36 cc. of water were introduced and the solution was agitated. The precipitated alumina was vacuum filtered. Water was added to the filtrate and the organic solvents were eliminated by steam distillation. The aqueous mixture was cooled and the precipitate formed was vacuum filtered, washed with water and dried. The recovered raw product was crystallized from methanol containing 1 part per thousand of pyridine, thus obtaining 30.8 gm. of 3,5-bis-(ethylenedioxy)-4,5-seco-estrane-17-one. The product had a melting point of 114° C.

A sample of this product, purified for analysis by crystallization first from isopropyl ether containing 1 part per thousand or pyridine, then from methanol containing 1 part per thousand of pyridine, had a melting point of 114° C. and a specific rotation $[\alpha]_D^{20}=+75°\pm1.5°$ (c.=1% in methanol containing 1% of pyridine), and had the following characteristics:

*Analysis.*—$C_{22}H_{34}O_5$; molecular weight =378.49. Calculated (percent): C, 69.81; H, 9.05. Found (percent): C, 69.9; H, 8.9.

Infrared spectra (in chloroform)

Absorption at 1,732 cm.$^{-1}$: carbonyl and C—O—C band characteristic of the ketal function.

This product is not described in the literature.

EXAMPLE III

Preparation of 3,5-bis-(ethylenedioxy)-4,5-seco-estrane-17-one, starting with 4,5-seco-estrane-17β-ol-3,5-dione 10 gm. of 4,5-seco-estrane-17β-ol-3,5-dione, a product described in French Pat. No. 1,432,569, were introduced into 60 cc. of methylethyldioxolane. The mixture was brought to reflux under an inert atmosphere and 1 volume of solvent was distilled therefrom under normal pressure. The mixture was then cooled toward 75° C. and 0.050 gm. of paratoluene sulfonic acid was added. Under a slight vacuum, the mixture was distilled for 3 hours at about 75° C., recovering about 10 cc. of distillate per hour and maintaining the reaction media at a constant volume by the addition of methylethyldioxolane. Thereafter, the methylethyldioxolane was eliminated under reduced pressure. The reaction media was cooled. 20 cc. of benzene and 0.4 cc. of pyridine were added to the reaction mixture, which was then homogenized and was, after 18 cc. of water and 2 cc. of a saturated solution of sodium bicarbonate had been added, agitated for 10 minutes. The benzenic phase was separated by decanting and washed with water. The aqueous phases were re-extracted with benzene. After having been washed with water, these benzenic reextracts were combined with the principal benzenic solution. After the addition of one drop of pyridine, the whole of the combined benzenic solutions was concentrated to dryness under reduced pressure. The resultant residue was dissolved in hot ethyl ether. The ether was expelled under vacuum and the crystallizate was dried. 13.27 gm. of a raw product were obtained, having a melting point of 90° to 100° C. and a specific rotation $[\alpha]_D^{20}=+18°\pm1°$ (c.=1% in methanol containing 1% of pyridine).

This raw product was recrystallized from isopropyl ether containing 1 part per thousand of pyridine, thus obtaining 8.75 gm. of 3,5-bis-(ethylenedioxy)-4,5-seco-estrane-17β-ol, having a melting point of 90° C. to 100° C. with a specific rotation of $[\alpha]_D^{20}=+19.5°\pm1°$ (c.=1% in methanol containing 1% of pyridine). This product was identical to the 3,5-bis-(ethylenedioxy)-4,5-seco-estrane-17β-ol prepared in Step A of the preceding example. By applying the process described in Step B of the preceding example to this compound, 3,5-bis-(ethylenedioxy)-4,5-seco-estrane-17-one was obtained, which was identical to the product prepared according to Example II.

EXAMPLE IV

Preparation of 3,5-bis-(ethylenedioxy)-4,5-seco-$\Delta^{9(11)}$-estrene-17-one

Step A: Preparation of 3,5-bis-(ethylenedioxy)-17β-benzoyloxy - 4,5 - seco - $\Delta^{9(11)}$-estrene.—Under an atmosphere of nitrogen, 2 gm. of 17β-benzoyloxy-4,5-seco-$\Delta^9$-estrene-3,5-dione, having a specific rotation $[\alpha]_D^{20}=+43°$ (c.=1% in methanol), a product described in French Pat. No. 1,243,000, were introduced into 60 cc. of methylethyldioxolane. 0.06 gm. of paratoluene sulfonic acid monohydrate were added thereto, and the reaction mixture was heated under agitation in order to obtain within the space of 5 hours a volume of distillate of about 20 cc. while maintaining the reaction volume constant by the regular addition of methylethyldioxolane. The pH was adjusted to 8.0 by the addition of an aqueous solution of sodium bicarbonate. The organic phase was separated by decanting, washed with water until neutrality was attained and dried. One drop of pyridine was added to the organic phase, which was then distilled to dryness under reduced pressure. Next, ethanol was added to the residue and the mixture was again concentrated to dryness under reduced pressure.

The resultant residue was crystallized from ethanol, thus obtaining 1.6 gm. of 3,5-bis-(ethylenedioxy)-17β-benzoyloxy-4,5-seco-$\Delta^{9(11)}$-estrene. The product had a melting point of 165° to 166° C.

A sample of this product, recrystallized first from isopropyl ether in the presence of pyridine, then from ethanol also in the presence of pyridine, had the following constants:

Melting point=166° to 167° C.
Specific rotation=$[\alpha]_D^{20}=+23.2°$ (c.=0.9% in methanol).

Analysis.—$C_{29}H_{38}O_6$; molecular weight=482.6. Calculated (percent): C, 72.17; H, 7.93. Found (percent): C, 72.4; H, 8.1.

Ultraviolet spectra (in ethanol)

max. at 230 mμ ε=14,300
max. at 273 mμ ε=910
max. at 280 mμ ε=720

This product is not described in the literature.

Step B: Preparation of 3,5-bis-(ethylenedioxy)-4,5-seco-$\Delta^{9(11)}$-estrene-17β-ol.—Under an atmosphere of nitrogen, 600 mg. of 3,5-bis-(ethylenedioxy)-17β-benzoyloxy-4,5-seco-$\Delta^{9(11)}$-estrene were introduced into 19 cc. of a 0.158 N potassium hydroxide solution. The mixture was maintained at reflux for one hour then concentrated to dryness under reduced pressure. Next, water was added to the mixture, which was then extracted with ether and the extracts were combined. The organic solution obtained was washed with water, dried and concentrated to dryness. After adding isopropyl ether, the solution was crystallized, vacuum filtered and dried. In this manner, 362 mg. of 3,5-bis-(ethylenedioxy)-4,5-seco-$\Delta^{9(11)}$-estrene-17β-ol were obtained having a melting point of 130° C.

A sample of this product was purified by crystallization first from isopropyl ether, then from petroleum ether (boiling range=60° to 80° C.). The product had a melting point of 132° C. and a specific rotation $[\alpha]_D^{20}=+25.8°$ (c.=0.7% in methanol).

Analysis.—$C_{22}H_{34}O_5$; molecular weight=378.49. Calculated (percent): C, 69.81; H. 9.05. Found (percent): C, 69.8; H, 9.1.

This product is not described in the literature.

Step C: Preparation of 3,5-bis-(ethylenedioxy)-4,5-seco-$\Delta^{9(11)}$-estrene-17-one.—Within a space of 10 minutes, about 1 gm. of chromic acid, followed by a solution composed of 10 cc. of pyridine and 1 gm. of 3,5-bis-(ethylenedioxy)-4,5-seco-$\Delta^{9(11)}$-estrene-17β-ol were introduced into 10 cc. of pyridine cooled to 0° C. This mixture was allowed to warm to a temperature of 20° C., then agitated for 15 hours at this temperature. Thereafter, the reaction mixture was poured into water and filtered. The aqueous phase was extracted with methylene chloride and the methylene chloride extracts were combined. The organic solution obtained was washed with water and dried, then concentrated to dryness under reduced pressure.

The residue was crystallized from isopropyl ether and 0.665 gm. of 3,5-bis-(ethylenedioxy)-4,5-seco-$\Delta^{9(11)}$-estrene-17-one was obtained, having a melting point of 98° C.

A sample of this product was purified for analysis by crystallization from isopropyl ether. It had a melting point of 98° C. and a specific rotation $[\alpha]_D^{20}=+105°$ (c.=0.5% in methanol).

Analysis.—$C_{22}H_{32}O_5$; molecular weight=376.46. Calculated (percent): C, 70.18; H, 8.56. Found (percent): C, 70.1; H, 8.5.

This product is not described in the literature.

EXAMPLE V

Preparation of 19-nor-$\Delta^4$-pregnene-16α,17α-diol-3,20-dione

Step A: Preparation of 3,5-bis-(ethylenedioxy)-17β-cyano-4,5-seco-estrane-17α-ol.—500 gm. of 3,5-bis-(ethylenedioxy)-4,5-seco-estrane-17-one (described in Step B of Example II) were dissolved in 10 liters of methanol; then 860 gm. of potassium cyanide were introduced therein. Next, within the space of about one hour, 600 cc. of acetic acid were added and the reaction mixture was agitated for 18 hours at room temperature. Thereafter, 300 cc. of acetic acid and 10 liters of water were introduced into the reaction mixture, which was then agitated for 3 hours. The precipitate formed was isolated by being vacuum filtered and dried.

This raw product was purified by crystallization from ethyl ether, thus obtaining 259.5 gm. of 3,5-bis-(ethylenedioxy)-17β-cyano-4,5-seco - estrane - 17α-ol, having a melting point of 145° C. and a specific rotation $[\alpha]_D^{20}=+33°$ (c.=1% in methanol containing 1% of pyridine).

Analysis.—$C_{23}H_{35}O_5N$; molecular weight=405.52. Calculated (percent): C, 68.12; H, 8.7; N, 3.45. Found (percent): C, 68; H, 8.7; N, 3.6.

This product is not described in the literature.

Recovery of the starting product (a) 1 kg. of potassium hydroxide was introduced into the raw methanolic mother liquors. The mixture was agitated for 15 minutes. Then 10 liters of water were added and the reaction mixture was agitated for 20 hours. Thereafter, the precipitate formed was isolated by filtration, washed and dried. In this way, 210 gm. of 3,5-bis-(ethylenedioxy)-4,5-seco-estrane-17-one were recovered, having a melting point of 114° C. and a specific rotation $[\alpha]_D^{20}=+75°$ (c.=1% in methanol containing 1% of pyridine), identical to the starting product.

(b) The mother liquors of the crystallization from ether were concentrated to dryness. The residue obtained was purified by chromatography through alumina, then crystallized in ether, obtaining a further yield of 3,5-bis-(ethylenedioxy)-17α-cyano-4,5-seco-estrane-17β - ol, having a melting point of 145° C. and a specific rotation $[\alpha]_D^{20}=-17.5°$ (c.=1% in methanol containing 1% in pyridine).

Analysis.—$C_{23}H_{35}O_5N$; molecular weight=405.52. Calculated (percent): C, 68.12; H, 8.7; N, 3.45. Found (percent): C, 68.4; H, 8.7; N, 3.7.

By adding potassium hydroxide in hydromethanolic medium, this product leads to 3,5-bis-(ethylenedioxy)-4,5-seco-estrane-17-one, which could be again used for the same preparation.

Step B: Preparation of 3,5-bis-(ethylenedioxy)-17-cyano-4,5-seco-$\Delta^{16}$-estrene.—At room temperature, 20 gm. of 3,5-bis - (ethylenedioxy) - 17β - cyano-4,5-seco-estrene-17α-ol, with a specific rotation $[\alpha]_D^{20} = +33°$ (c.=1% in methanol containing 1% of pyridine), were dissolved in 80 cc. of pyridine. Within about 15 minutes, 20 cc. of thionyl chloride were added and the mixture was agitated over a period of 20 hours. Thereafter, the reaction mixture was poured into a water-ice mixture containing 40 gm. of sodium carbonate. Ethyl ether was added thereto and the reaction mixture was again agitated. Then the precipitate formed was eliminated by filtration. The ethereal phase in the filtrate obtained was separated by decanting. The aqueous phase was extracted with ethyl ether and the ethereal phases were combined. The ethereal solution obtained was washed, successively, first with water, then with an aqueous solution of sodium bicarbonate and again with water. The ethereal solution was dried, then concentrated to dryness.

The residue washed with isopropyl ether, was recrystallized from methanol containing 1 part per thousand of pyridine, thus obtaining 8 gm. of 3,5-bis-(ethylenedioxy)-17-cyano-4,5-seco-$\Delta^{16}$-estrene. The product had a melting point of 115° C. and a specific rotation $[\alpha]_D^{20} = +35°$ (c.=1% in methanol containing 1 part per thousand of pyridine).

A sample of this product was recrystallized from methanol containing 1 part per thousand of pyridine.

Analysis.—$C_{23}H_{33}O_4N$; molecular weight=387.49. Calculated (percent): C, 71.28; H, 8.58; N, 3.61. Found (percent): C, 71.1; H, 8.5; N, 3.8.

Ultraviolet spectra (in ethanol)

max. at 217 to 218 mµ ε=7,960
max. at 264 mµ ε=35

This product is not described in the literature.

The sulfite of bis-(3,5-bis-[ethylenedioxy]-17β-cyano-4,5-seco-estrane-17α-ol) could be isolated in the following manner. 5 gm. of 3,5-bis-(ethylenedioxy)-17β-cyano-4,5-seco-estrane-17α-ol were dissolved in 20 cc. of pyridine at room temperature. Then within two minutes 0.5 cc. of thionyl chloride were added and the mixture was agitated for one hour at room temperature. Thereafter the reaction mixture was poured into a water-ice mixture containing 5 gm. of sodium carbonate. The sulfite crystallized. It was vacuum filtered, washed to neutrality and dried, thus obtaining the raw sulfite which was then recrystallized from acetone. In this manner, 3.3 gm. of sulfite were recovered, having a melting point of 212° C. with a specific rotation of $[\alpha]_D^{20} = +37°$ (c.=0.5% in chloroform containing 1 part per thousand of pyridine).

Analysis.—$C_{46}O_{11}H_{68}SN_2$; molecular weight=857.09. Calculated (percent): C, 64.45; H, 8.0; O, 20.53; N, 3.27; S, 3.74. Found (percent): C, 64.5; H, 7.8; O, 20.7; N, 3.4; S, 4.

This product is not described in the literature.

Subjected to the action of thionyl chloride in pyridine, this sulfite leads to 3,5-bis-(ethylenedioxy)-17-cyano-4,5-seco-$\Delta^{16}$-estrene which could be used again.

Step C: Preparation of 4,5-seco-19-nor-$\Delta^{16}$-pregnene-3,5,20-trione.—Under an inert atmosphere and within the period of about 20 minutes, a solution of 33 gm. of 3,5-bis-(ethylenedioxy)-17-cyano-4,5-seco-$\Delta^{16}$-estrene in 100 cc. of benzene was introduced into 300 cc. of a methyl lithium solution in ethyl ether containing 1.35 mols/liter. This mixture was agitated for 30 minutes at room temperature. The reaction solution, containing 3,5-bis-(ethylenedioxy)-20-imino - 4,5 - seco-19-nor-$\Delta^{16}$-pregnene, was poured within a period of about 15 minutes into an acetic acid-water-ice mixture. The organic phase was separated by decanting. The benzene and the ether were eliminated by distillation. Then the solution obtained was maintained for 2 hours at 95° C. Thereafter, it was mixed with benzene and water. The organic phase was separated by decanting. The aqueous phase was extracted with benzene, and the benzenic extracts were combined. The organic solution obtained was washed, successively with water, with an aqueous solution of sodium bicarbonate and again with water. The benzenic solution was dried, then concentrated to dryness under vacuum.

Thus, 27.35 gm. of 4,5-seco-19-nor-$\Delta^{16}$-pregnene-3,5,20-trione were obtained, which product was utilized as such for the next step.

This product is not described in the literature.

Step D: Preparation of 3-pyrrolidyl-19-nor-$\Delta^{3,5,16}$-pregnatriene-20-one.—Under an atmosphere of nitrogen, 27 gm. of 4,5-seco-19-nor-$\Delta^{16}$-pregnene-3,5,20-trione were introduced into 162 cc. of methanol. Then the mixture was filtered to obtain a clear solution. Next, 10.8 cc. of pyrrolidine were added and the mixture was agitated for 30 minutes at room temperature. The precipitate formed was isolated by filtration, washed and dried.

This raw product was purified by trituration in dimethylformamide, thus obtaining 14.26 gm. of 3-pyrrolidyl-19-nor-$\Delta^{3,5,16}$-pregnatriene-20-one with a melting point of 174 to 175° C.

A sample of this product was purified by recrystallization from dimethylformamide. A product was obtained having a melting point of 175° C. and a specific rotation $[\alpha]_D^{20} = -177° \pm 3.5°$ (c.=0.5% in dimethylformamide).

Analysis.—$C_{24}H_{33}ON$; molecular weight=351.5. Calculated (percent): C, 82.01; H, 9.46; N, 3.98. Found (percent): C, 82; H, 9.3; N, 4.2.

This product is not described in the literature.

Step E: Preparation of 19-nor-$\Delta^{4,16}$-pregnadiene-3,20-dione.—Under an atmosphere of nitrogen and at a temperature of 50° C., 14.2 gm. of 3-pyrrolidyl-19-nor-$\Delta^{3,5,16}$-pregnatriene-20-one were introduced into 142 cc. of an aqueous 2 N sulfuric acid solution. The mixture was agitated for 15 minutes at 50° C., then 5 hours at room temperature. Thereafter, the precipitate formed was eliminated by filtration, and the filtrate was poured under agitation within a period of about one hour into 213 cc. of an aqueous 2 N sodium hydroxide solution. The solution was agitated for 2 hours at 20° C., then acidified to obtain a pH of 2 by the addition of a dilute aqueous sulfuric acid solution, and again agitated. The precipitate formed was isolated by filtration, washed and dried.

This raw product was purified by crystallization from methanol thus obtaining 8.80 gm. of 19-nor-$\Delta^{4,16}$-pregnadiene-3,20-dione. The product had a melting point of 181° C. and was utilized as such for the next step.

A sample of this product was purified by recrystallization from methanol and had a melting point of 182° C. and a specific rotation $[\alpha]_D^{20} = +116° \pm 2°$ (c.=1% in methanol).

Analysis.—$C_{20}H_{26}O_2$; molecular weight=298.41. Calculated (percent): C, 80.49; H, 8.78. Found (percent): C, 80.5; H, 8.7.

Ultraviolet spectra (in ethanol)

max at 240 mµ ε=26,850

This product is not described in the literature.

Step F: Preparation of 19-nor-$\Delta^4$-pregnene-16α,17α-diol-3,20-dione.—8.475 gm. of 19-nor-$\Delta^{4,16}$-pregnadiene-3,20-dione were dissolved in a mixture of 203 cc. of acetone and 16.9 cc. of water. Next, 2.1 cc. of formic acid and then at a temperature of 20° C. within a period of about 30 minutes, a solution of 5.5 gm. of potassium permanganate in a mixture of 106 cc. of acetone and 42.5 cc. of water were introduced therein. Thereafter, a solution of 8 gm. of sodium metabisulfite in 31.5 cc. of water was added to the reaction mixture. The acetone was eliminated by distillation under vacuum. The reaction mixture was cooled to 20° C. and a mixture of 9 cc. of an aqueous solution of 22° Bé. hydrochloric acid and of 8.5 cc. of water was introduced into the reaction mixture, which was then agitated for 30 minutes. The precipitate formed was vacuum filtered, washed and dried.

In this manner, 7.25 gm. of 19-nor-Δ⁴-pregnene-16α,17α-diol-3,20-dione were obtained.

A sample of this product was purified by crystallization from acetone, then from ethyl acetate and had the following characteristics:
Melting point, determined on the Maquenne block:
(1) 180° to 185° C.
(2) 200° to 205° C.
Specific rotation $[\alpha]_D^{20} = +32°$ (c.=1% in methanol)
Analysis.—$C_{20}H_{28}O_4$; molecular weight=332.42. Calculated (percent): C, 72.25; H, 8.49. Found (percent): C, 72.3; H, 8.5.

Ultraviolet spectra

λ max. 240 mμ ε=17,500

The 19-nor-Δ⁴-pregnene-16α,17α-diol-3,20-dione could be converted into 16α,17α-isopropylidenedioxy-19-nor-Δ⁴-pregnene-3,20-dione in the following manner:

1 gm. of 19-nor-Δ⁴-pregnene-16α,17α-diol-3,20-dione, then 0.04 cc. of an aqueous solution of 55° Bé. perchloric acid were introduced into 10 cc. of acetone. The mixture was heated to and maintained at reflux for 30 minutes. Next, the reaction mixture was agitated for one hour and 30 minutes at a temperature of 30° C. The pH was adjusted to about 8.0 by the addition of an aqueous solution of sodium bicarbonate, and 10 cc. of water were added. The precipitate formed was vacuum filtered, washed and dried.

The raw product obtained was purified by crystallization from acetone, thus obtaining 0.710 gm. of 16α,17α-isopropylidenedioxy-19-nor-Δ⁴-pregnene - 3,20 - dione, with a melting point of 228° C.

A sample of this product was purified by a second crystallization from acetone, and had a melting point of 228° C., and a specific rotation $[\alpha]_D^{20} = +88°$ (c.=1% in chloroform).

Analysis.—$C_{23}H_{32}O_4$; molecular weight=372.49. Calculated (percent): C, 74.15; H, 8.66. Found (percent): C, 74.3; H, 8.7.

Ultraviolet spectra (in ethanol)

max. at 240 mμ ε=17,400

The preceding specific embodiments are illustrative of the process of the invention. It is to be understood, however, that other expedients known to those skilled in the art can be employed without departing from the spirit of the invention or the scope of the appended claims.

We claim:
1. A process for the production of 16α,17α-dihydroxy-19-nor-progesterone which comprises the steps of reacting a 3,5-diketal of 4,5-secoestrane-3,5,17-trione of the formula

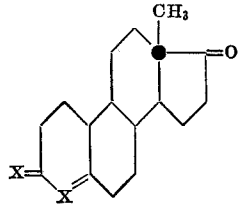

wherein X represents a member selected from the group consisting of

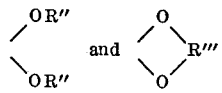

wherein R″ is lower alkyl and R‴ is selected from the group consisting of lower alkylene and (6-methylbenzyl)-ethylene, with an alkali metal cyanide in the presence of an organic acid, dehydrating the resultant 3,5-diketal of 17β-cyano-4,5-seco-estrane-17α-ol-3,5-dione by the action of an acid dehydrating agent in the presence of a polar solvent, reacting the resultant 3,5-diketal of 17-cyano-4,5-seco-Δ¹⁶-estrene-3,5-dione with a methylating agent selected from the group consisting of methyl lithium and methyl-magnesium halide, hydrolyzing the resultant 3,5-diketal of 20 - imino - 4,5 - seco-19-nor-Δ¹⁶-pregnene-3,5-dione by the action of an acid, cyclizing the resultant 4,5-seco-19-nor-Δ¹⁶-pregnene-3,5,20-trione by the action of a secondary amine, reacting the resultant 3-enamine of 19-nor-Δ⁴,¹⁶-pregnadiene-3,20-dione with an aqueous acid and thereafter with an aqueous alkali metal hydroxide, reacting the resulting 19-nor-Δ⁴,¹⁶-pregnadiene-3,20-dione with a hydroxylating agent which acts on the 16(17) double bond, and recovering said 16α,17α-dihydroxy-19-nor-progesterone.

2. The process of claim 1 wherein said reaction with an alkali metal cyanide is conducted in the presence of a lower alkanoic acid, as said organic acid, and a lower alkanol in a basic media.

3. The process of claim 1 wherein said acid dehydrating agent in the presence of a polar solvent is selected from the group consisting of thionyl chloride, phosphorus oxychloride, and methanesulfonyl chloride, in a cyclic tertiary amine.

4. The process of claim 1 wherein said reaction with said methylating agent is conducted in the presence of an ether selected from the group consisting of ethylether and tetrahydrofuran.

5. The process of claim 1 wherein said hydrolyzing by the action of an acid is conducted by a lower alkanoic acid.

6. The process of claim 1 wherein said secondary amine is pyrrolidine and the cyclization is conducted in a lower alkanol solvent.

7. The process of claim 1 wherein said reaction of said 3-enamine with an aqueous acid is conducted with an aqueous mineral acid.

8. The process of claim 1 wherein said hydroxylating agent which acts on the 16(17) double bond is selected from the group consisting of potassium permanganate and osmium tetraoxide.

References Cited

UNITED STATES PATENTS 3,243,433   3/1966   Fried et al.

HENRY A. FRENCH, Primary Examiner

U.S. Cl. X.R.

260—239.55 D, 340.9, 397.3, 586 H

PO-1050 (5/69)

UNITED STATES PATENT OFFICE
CERTIFICATE OF CORRECTION

Patent No. 3,637,770          Dated January 25, 1972

Inventor(s) Jean Jolly and Robert Joly

It is certified that error appears in the above-identified patent and that said Letters Patent are hereby corrected as shown below:

| IN THE PATENT | | APPLICATION | | |
|---|---|---|---|---|
| Column | Line | Page | Line | |
| 1 | 4 | | | Delete "Julien Warnant, Neuilly-sur-Seine," |
| 3 | 1 | 8 | 5 | "R" should be -- R' --. |
| 6 | 43 | 18 | 18 | After "invention." the sentence "However, it is to be understood that they are not to be deemed limitative in any degree." has been omitted. |
| 11 | 1 & 2 | 42 | 24 & 25 | Line 1 should be line 2 and line 2 should be line 1. |
| 11 | 8 | 43 | 4 | "estrene" should be -- estrane --. |

Signed and sealed this 23rd day of January 1973.

(SEAL)
Attest:

EDWARD M. FLETCHER, JR.
Attesting Officer

ROBERT GOTTSCHALK
Commissioner of Patents